United States Patent [19]
Yankura

[11] Patent Number: 5,371,784
[45] Date of Patent: Dec. 6, 1994

[54] REMOTE AUXILLIARY CHARGING CRADLE FOR CORDLESS TELEPHONE HANDSET

[75] Inventor: Peter J. Yankura, Toms River, N.J.

[73] Assignee: AT&T Corp., Murray Hill, N.J.

[21] Appl. No.: 212,657

[22] Filed: Mar. 10, 1994

Related U.S. Application Data

[63] Continuation of Ser. No. 904,081, Jun. 25, 1992, abandoned.

[51] Int. Cl.⁵ ............... H04M 11/00; H04B 7/00; H04B 1/16; H01M 10/44
[52] U.S. Cl. .................. 379/61; 455/343; 455/38.3; 320/21
[58] Field of Search ............. 379/455, 61, 58; 455/343, 127, 38.3; 320/21

[56] References Cited

U.S. PATENT DOCUMENTS

| | | | |
|---|---|---|---|
| 4,884,294 | 11/1989 | Inagami | 379/61 |
| 5,005,198 | 4/1991 | Toda | 379/61 |
| 5,204,611 | 4/1993 | Nor et al. | 320/21 |

*Primary Examiner*—James L. Dwyer
*Assistant Examiner*—Jack Chiang
*Attorney, Agent, or Firm*—Samuel R. Williamson

[57] ABSTRACT

A remote charging cradle is configured for charging a cordless telephone handset unit and also permits the handset unit to receive and respond to a radio frequency ringing signal while located in this cradle. While being charged, the handset unit looks for a ringing signal over a direct-current charging path provided through its battery charge contacts. The operation which permits charging of the handset unit while also permitting the handset unit to receive a radio frequency ringing signal is achieved through a power cycling arrangement which controls the period over which the charging current from the cradle is applied to the handset unit. By applying this charging current periodically and then only for relatively short periods of time, the handset unit is able to sense the radio frequency ringing signal generated by an associated base unit during those periods when the charging current is not being applied and thereby respond to the ringing signal.

11 Claims, 2 Drawing Sheets

REMOTE AUXILLIARY CHARGING CRADLE FOR CORDLESS TELEPHONE HANDSET

This application is a continuation of application Ser. No. 07/904081 filed on Jun. 25, 1992 now abandoned.

BACKGROUND OF THE INVENTION

1. Technical Field

This invention relates to cordless telephones and, more particularly, to a remote cordless telephone handset cradle for use with a cordless telephone handset.

2. Description of the Prior Art

Cordless telephones have evolved over the years from standard cordless telephone sets which comprise a base unit and an associated handset unit to cordless telephone sets which also include an auxiliary cradle for nesting the handset unit therein when the handset unit is located ten-tote from the base unit.

Some manufacturers of cordless telephone sets provide an auxiliary cradle without a source of charging current or other electronics in the cradle, but rather just for nesting the handset unit therein. Other manufacturers provide an auxiliary handset cradle that provides this source of current for charging the telephone handset unit. This handset charging cradle supplies a continuous charging current for the handset unit whenever the handset unit is placed in the cradle.

Some cordless telephones sets now advantageously include enhanced handset units that contain circuitry for providing increased functionality in communications between the associated base unit and the handset unit. The circuitry within these enhanced handset units allows these handset units to receive a ringing signal while located either in the cradle of the base unit or remote from the base unit. While located in the cradle of the base unit, the enhanced handset units are arranged so that data, representative of a ringing signal or a security code, for example, is provided to the handset unit over a direct-current changing path. This charging path is formed through mating contacts located on both the base unit and the handset unit in accordance with the teachings of U.S. Pat. No. 4,736,404 issued to R. E. Anglikowski et al. on Apr. 5, 1988. While the handset unit is located remote from the base unit, a ringing signal is provided to the handset unit via a radio frequency link between the base unit and the handset unit on a predetermined channel.

Although an auxiliary handset cradle which provides continuous charging current has been found satisfactory for use with a cordless telephone handset unit which receives a ringing signal from its associated base unit via a radio frequency link while in the associated base unit, such an arrangement is undesirable for use with an enhanced handset unit which looks for a ringing signal over the direct-current charging path through its battery charge contacts while it is being charged. It is therefore desirable to have an auxiliary handset cradle that allows charging of an enhanced handset unit while also permitting this handset unit to respond to a ringing signal while located in this auxiliary handset cradle.

SUMMARY OF THE INVENTION

In accordance with the invention, an auxiliary handset cradle provides a source of energy for charging a cordless telephone handset unit which operates in an enhanced mode and also permits the handset unit to receive and respond to ringing signals while located in this cradle.

This advantageous operation is achieved, in preferred embodiments, through a cycling scheme which controls the period over which the source of energy from the auxiliary handset cradle is applied to the telephone handset unit. By applying this source of energy periodically and then only for relatively short periods of time, the handset unit is able to sense a radio frequency ringing signal generated by an associated base unit during those periods when the source of energy is not being applied by the auxiliary handset cradle and respond to the radio frequency ringing signal.

BRIEF DESCRIPTION OF THE DRAWING

This invention and its mode of operation will be more clearly understood from the following detailed description when read with the appended drawing in which.

DETAILED DESCRIPTION

Figure 1:
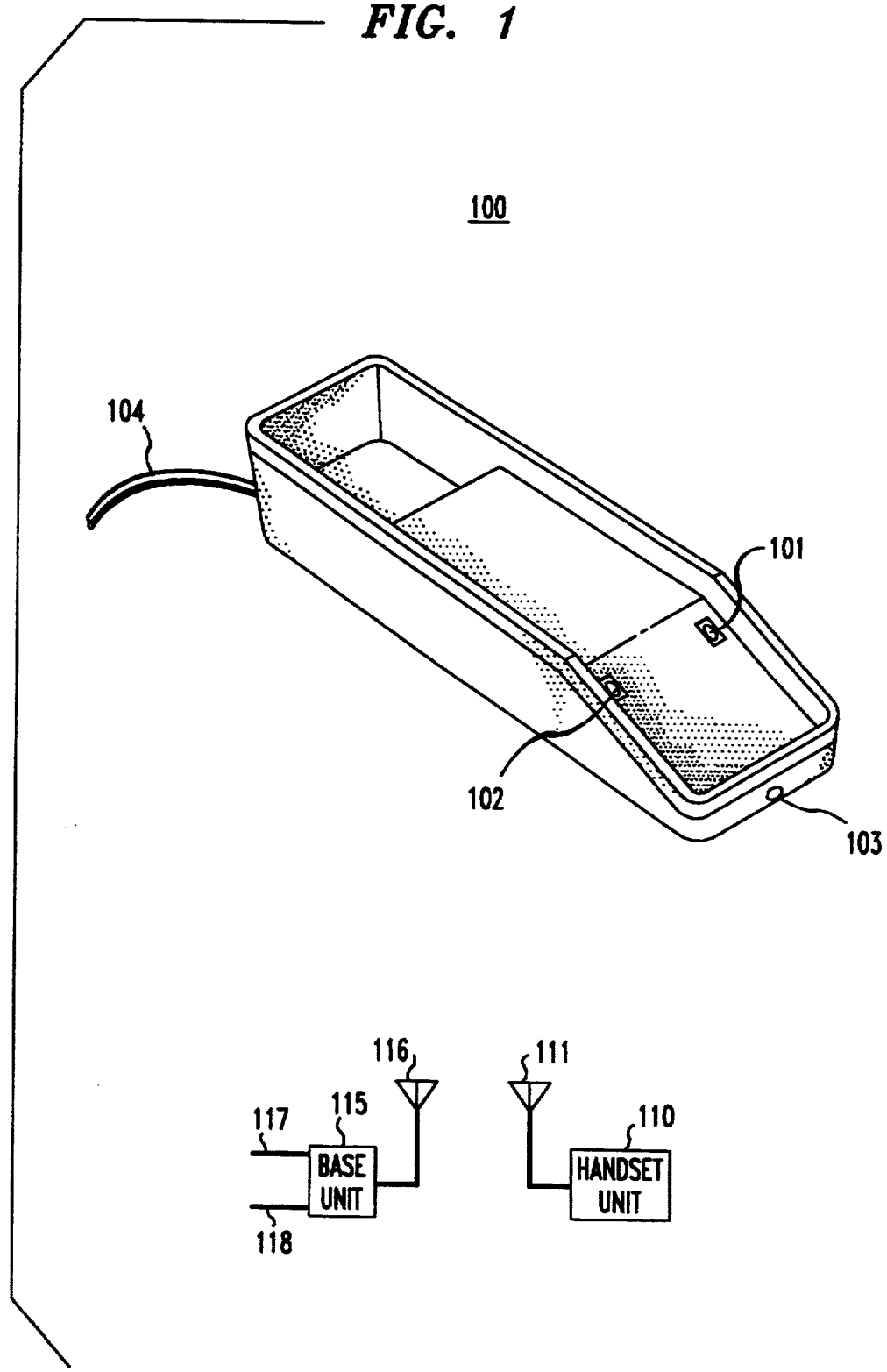
FIG. 1 is an illustration of a cordless telephone base unit, a cordless telephone handset unit and a remote charging cradle for use by the cordless telephone handset unit, in accordance with the invention.

Referring now to FIG. 1, there is illustratively shown a remote charging cradle 100 for a cordless telephone handset unit 110. Contained in the cradle are a pair of charge contacts 101 and 102 for mating with a pair of charge contacts (not shown) on the cordless telephone handset unit when the handset unit is nested in the cradle. Also contained in the cradle 11210 is a light emitting diode (LED) 103 which provides an indication when the handset unit is present in and being charged by the cradle. A line cord 104 connects an external power supply to the charging cradle. In the alternative, the power supply also may be located in the cradle 100 and the line cord 104 connected to a source of alternating-current voltage. In either case, power supplies are well known by those skilled in the art and are not further described herein.

The cordless telephone handset units that are accommodated by the remote charging cradle 100 are those enhanced handset units that provide increased functionality in communications between an associated base unit (not shown) and the handset unit. These handset units contain circuitry for improving security and minimizing power consumption, for example. Such handset units are known in the art and are commercially available from, for example, AT&T as part of AT&T cordless telephone sets Model Nos. 5200, 5300, 5400, 5500 and 5600.

These enhanced handset units include a battery which allows operation of the handset unit 115 while remote from the associated base unit. This base unit connects to a source of alternating current voltage via line 117 and to a tip-ring line 118. The battery is normally charged when the handset unit is placed in a charging cradle on the base unit. A direct-current charging path for the battery is established over mating contacts in both the base unit and in the handset unit for charging of the battery. These contacts also allow transfer circuits in the base unit and the handset unit to respectively transmit and receive a ringing signal over this path. When the base unit and the handset unit are in such close proximity, this transfer arrangement advantageously avoids signal overloading of the respective radio receivers in the base unit and the handset unit that might otherwise occur if the ringing signal, and the response thereto, were provided over a radio frequency (RF) link via antennas 111 and 116. This transfer arrangement also avoids the possibility of needless interference to other nearby cordless telephone sets when in such close proximity by not having to generate the ringing signal over the RF link. An arrangement suitable for transferring data representative of the ringing signal and other data over a direct-current charging path is described in detail in U.S. Pat. No. 4,736,404 issued to R. E. Anglikowski et al. on Apr. 5, 1988, this patent being incorporated herein by reference.

While the enhanced handset unit 110 is located remote from the base unit 115, the ringing signal is provided to the handset unit via the RF link between the base unit and the handset unit on a predetermined channel. For the remote operation of the enhanced handset unit, a controlled power-up/power-down mode of operation is normally implemented. In this mode, power to the radio receiver, a control unit and certain other selected circuitry in the handset unit is controlled to minimize power consumption when the handset unit is in a standby-and-out-of-cradle state. The handset unit enters and resides in this mode after approximately 10 seconds have elapsed from the time it was either being charged or last used by a user in communicating with the base unit. Power to other non-essential circuitry in the handset unit is turned completely off while operating in this power conserving mode. Operation of such a handset unit is described in detail in U.S. Pat. No. 4,731,814 issued to W. R. Becker et at. on Mar. 15, 1988, this patent being incorporated herein by reference. An illustration of a handset unit suitable for including circuitry for providing an enhanced handset unit is shown in U.S. Pat. No. Des. 279,005 issued to D. M. Genaro et al. on May 28, 1985, this handset unit also being incorporated herein by reference.

Figure 2:
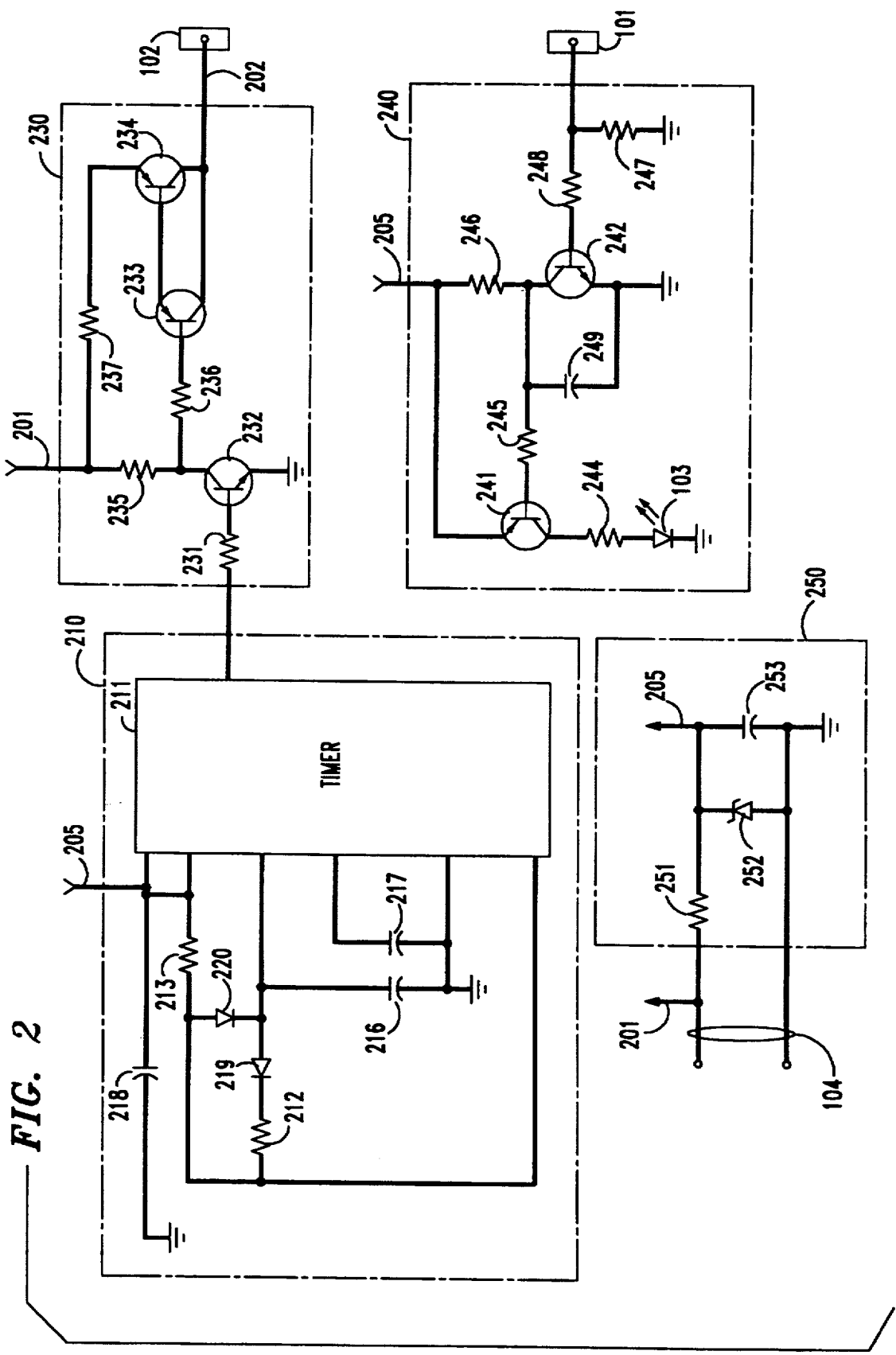
FIG. 2 shows circuitry suitable for use in the remote charging cradle illustrated in FIG. 1, in accordance with the invention.

Referring next to FIG. 2, them is shown the circuitry contained in the remote charging cradle 100 shown in FIG. 1. This illustrated circuitry conveniently may be constructed on a printed circuit board and generally comprises a timer circuit 210, a switching and charging circuit 230, an LED circuit 240 and a voltage regulator circuit 250.

The illustrated circuitry of FIG. 2 provides, in accordance with the invention, a means for charging a cordless telephone handset unit while allowing the handset unit to receive and respond to an RF ringing signal generated by the base unit while in the remote charging cradle. This is achieved by cycling the source of energy provided to the handset unit from the charging cradle between an on state and an off state for charging a battery, contained in the handset unit. This source of energy is applied periodically and then only for relatively short periods of time.

By way of operation, while located in the remote charging cradle, the handset unit looks for the ringing signal through the charge contacts whenever the source of energy is being applied and over the RF link when the source of energy is not being applied. By limiting the periods, when the source of energy is not being applied, to less than 10 seconds, the power-up/power-down mode of operation is not entered by the handset unit. The handset unit is thereby able to instantaneously receive and respond to the ringing signal received over the RF link within those periods when it is not being charged by the remote charging cradle.

The timer circuit 210 provides the basic timing for cycling between the on state and the off state the source of energy being provided to a handset unit. This timer circuit 210 comprises a timer 211, such as an NE555P available from NATIONAL SEMICONDUCTOR, and associated circuitry comprising resistors 212 and 213, capacitors 216 through 218, and diodes 219 and 220. This timer circuit 210 is an astable multivibrator whose duty cycle is, by way of example, one-half second in the on state and two and one-half seconds in the off state. The first duty cycle of one-half second is determined by the resistor-capacitor (RC) combination of resistor 213 and capacitor 216. The second duty cycle of two and one-half seconds is determined by the RC combination of resistor 212 and also capacitor 216. Diodes 219 and 220 provide isolation between the resistors providing the two different duty cycles. Capacitor 218 provides bypass filtering to the timer circuit 210, and the capacitor 217 provides bypass filtering to the timer 211.

The switching signal of the timer circuit 210 is provided at the output of the timer 211 and coupled to a resistor 231 comprising the input of the switching and charging circuitry 230. The switching and charging circuitry also receives a source of charging energy for a cordless telephone handset from a power supply (not shown) over line 201.

From resistor 231, the switching signal from the timer circuit 210 is coupled to the base of transistor 232 which switches the source of energy provided in the form of a high current to the telephone handset via a Darlington pair configured transistor comprising transistors 233 and 234. Transistor 232 serves as a driver transistor for transistors 233 and 234. Associated with transistor 232 are a pull-up resistor 235 and a coupling resistor 236 which couples the switching signal to the Darlington pair transistor configuration. Associated with the Darlington pair 233, 234 is a current limiting resistor 237 for limiting the amount of current supplied by line 201 through the Darlington pair to the line 202. The output of the Darlington pair 233, 234 is provided to the charge contact 102 of the pair of contacts 101 and 102.

A source of energy for the circuitry in the remote charging cradle is provided by a standard regulated direct-current (DC) power supply (not shown) over line 104 to a voltage regulator circuit 250. The voltage provided by the power supply is approximately 14 volts and, as earlier indicated, is provided over line 201 to the switching and charging circuit 230.

The voltage regulator circuit 250 comprises resistor 251, zener dime 252 and filter capacitor 253. Resistor 251 limits the current drawn by zener diode 252 which provides an output voltage at 11 volts DC. This voltage is filtered by the capacitor 253 and then coupled to the remainder of the circuitry in the remote charging cradle via line 205.

For providing an indication when the handset unit is present in the cradle 100 and the DC charging path established, the LED circuitry 240 is provided. This circuitry comprises transistors 241 and 242, the LED 103, resistors 244 through 248 and an electrolytic capacitor 249. When the handset unit is in the cradle 100, current is coupled from the charge contact 102 though the handset unit to the charge contact unit 101 and to transistor 242 via resistor 248. Resistor 247 serves to isolate charge contact 101 from circuit ground. Transistor 242 switches on and off with each pulse provided by the switching and charging circuitry 230. To cause LED 103 to remain illuminated and not flash at the switched rate, the capacitor 249 is included in this circuit. Associated pull-up resistor 246 is present to allow proper switching of transistor 242. Resistor 245 couples the switched voltage from transistor 242 to transistor 241. When transistor 241 switches on, it couples the regulated voltage on line 205 from the voltage regulator 250 through resistor 244 for illuminating the LED 103.

Various modifications of this invention are contemplated and may obviously be resorted to by those skilled in the art without departing from the spirit and scope of the invention as hereinafter defined by the appended claims.

I claim:

1. A remote charging cradle for a cordless telephone handset comprising:
   energy means for providing a source of energy for charging a battery in the telephone handset when the handset is placed in the charging cradle;
   timer means for generating a first predetermined time period and a second predetermined time period; and
   means for cycling the source of energy provided to the handset between an on state determined by the first predetermined dine period and an off state determined by the second predetermined time period for charging said battery while the handset is in the charging cradle, wherein the first and second time periods are cycling such that a radio frequency ring signal is not lost, and said handset receiving the radio frequency signal when said source of energy is in the off state.

2. The remote charging cradle as in claim 1 wherein the timer means includes a timer circuit for determining a period for cycling the source of energy provided to the handset.

3. The remote charging cradle as in claim 2 wherein the cycling means includes a switching and charging circuit, the switching and charging circuit receiving the source of energy and responsive to the timer circuit applying said source of energy to a pair of contacts on the charging cradle for receipt by the handset.

4. The remote charging cradle as in claim 3 wherein the cycling period for cycling the source of energy comprises cycling the source of energy to the on state for one-half second and to the off state for two and one-half seconds.

5. The remote charging cradle as in claim 3 further comprising an illumination circuit for providing an indication when the handset is located in the charging cradle and a direct-current charging path between the charging cradle and the handset unit has been established.

6. The remote charging cradle as in claim 5 wherein the energy means for providing the source of energy is a direct-current power supply.

7. A method of charging a cordless telephone handset in a remote charging cradle, the method comprising the steps of:
   providing a source of energy for charging a battery in the telephone handset when the handset is placed in the charging cradle;
   generating a first predetermined time period and a second predetermined time period; and
   cycling the source of energy provided to the handset between an on state determined by the first predetermined time period and an off state determined by the second predetermined time period for charging said battery while the handset is in the charging cradle, wherein the first and second time periods are cycling such that a radio frequency ring signal is not lost, and said handset receiving the radio frequency signal when said source of energy is in the off state.

8. The method of charging a cordless telephone handset as in claim 7 further comprising a switching and charging circuit, the switching and charging circuit receiving the source of energy and responsive to the time period determining step applying said source of energy to a pair of contacts on the charging cradle for receipt by the handset.

9. The method of charging a cordless telephone handset as in claim 8 wherein the time period determining step further includes the steps of cycling the source of energy to the on state for one-half second and to the off state for two and one-half seconds.

10. The method of charging a cordless telephone handset as in claim 8 further comprising an illumination circuit for providing an indication when the handset is located in the charging cradle and a direct-current charging path between the charging cradle and the handset unit has been established.

11. The method of charging a cordless telephone handset as in claim 8 wherein the source of energy is provided by a direct-current power supply.

* * * * *